United States Patent [19]
Lustiger et al.

[11] Patent Number: 6,153,703
[45] Date of Patent: Nov. 28, 2000

[54] SEMICRYSTALLINE POLYMER BLEND COMPOSITIONS WITH ENHANCED INTERSPHERULITIC AND INTERLAMELLAR STRENGTH

[75] Inventors: Arnold Lustiger, Edison, N.J.; Avinash C. Gadkari, Houston, Tex.

[73] Assignee: Exxon Research and Engineering Company, Florham Park, N.J.

[21] Appl. No.: 08/698,616

[22] Filed: Aug. 16, 1996

Related U.S. Application Data

[63] Continuation-in-part of application No. 08/320,022, Oct. 7, 1994, abandoned, which is a continuation-in-part of application No. 08/134,248, Oct. 8, 1993, abandoned, which is a continuation-in-part of application No. 07/958,972, Oct. 9, 1992, abandoned, which is a continuation-in-part of application No. 07/811,357, Dec. 20, 1991, abandoned.

[51] Int. Cl.[7] .............................. C08L 23/12; C08L 23/14
[52] U.S. Cl. .............................................. 525/240; 525/88
[58] Field of Search ........................................ 525/88, 240

[56] References Cited

U.S. PATENT DOCUMENTS

| 4,348,350 | 9/1982 | Meier | 264/291 |
|---|---|---|---|
| 4,937,299 | 6/1990 | Ewen | 525/240 |
| 5,212,247 | 5/1993 | Asanuma | 525/240 |
| 5,266,392 | 11/1993 | Land | 525/240 |
| 5,708,090 | 1/1998 | Schreck | 525/240 |

*Primary Examiner*—David J. Buttner
*Attorney, Agent, or Firm*—Gerard J. Hughes; Jay Simon; Paul E. Purwin

[57] ABSTRACT

This invention relates to a semicrystalline polymer composition with reinforced spherulite boundaries and interlamellar strength, comprising a major amount of a first semicrystalline polymer and a minor amount of a second semicrystalline homopolymer or a semicrystalline copolymer and a process of making the same.

5 Claims, No Drawings

SEMICRYSTALLINE POLYMER BLEND COMPOSITIONS WITH ENHANCED INTERSPHERULITIC AND INTERLAMELLAR STRENGTH

This application is a Continuation-in-Part of U.S. application Ser. No. 320,022, filed Oct. 7, 1994, now abandoned which is a Continuation-in-Part of U.S. application Ser. No. 134,248, filed Oct. 8, 1993 now abandoned, which is a Continuation-in-Part of U.S. application Ser. No. 958,972, filed Oct. 9, 1992 now abandoned, which is a Continuation-in-Part of U.S. application Ser. No. 811,357, filed Dec. 20, 1991 now abandoned.

FIELD OF THE INVENTION

This invention relates to polymer blend compositions having enhanced interspherulitic and interlamellar strength.

BACKGROUND OF THE INVENTION

Polypropylene crystallizes in a spherulitic morphology with inherently weak spherulite boundaries subject to fracture upon impact. The spherulite boundaries, which are critical to strength, tend to be weak causing premature failure under most loading conditions.

Polypropylene blends using ethylene as a toughening agent have been described, see for example "Morphology and Properties of Blends of Polypropylene with Ethylene-Propylene Rubber," Jang et al., *Polymer Engineering and Science*, V. 24, No. 8, Mid-June 1984 describing rubbers dispersed as small particles in the polypropylene matrix, "Polyesters to Polypeptide Synthesis," *Encyclopedia of Polymer Science and Engineering*, V. 12 pp 443–444 stating that polypropylene blends exhibit improved toughness, "Rubber-Toughening in Polypropylene," Jang et al.,*Journal of Applied Polymer Science*, V. 30, (1985), pp 2485–2504 observing that the rubber particles were randomly dispersed in the polypropylene matrix, were engulfed by the growing matrix, and did not reside preferentially at the spherulite boundaries, "Crystalline Morphology of Polypropylene and Rubber-Modified Polypropylene," *Journal of Applied Polymer Science*, V. 29, pp 4377–4393 (1984) showing that the rubber phase is not preferentially pushed to the spherulite boundaries and the distribution of the rubber particles is random in the polypropylene matrix. "Propylene/ethylene-co-propylene blends: influence of molecular structure of EPR and composition on phase structure of isothermally crystallized samples," D'Orazio et al., *Journal of Materials Science* V 26, pp 4033–4047 (1991) discusses amorphous EPR minor component segregation mainly in spherical shaped domains distributed in intra and interspherulitic regions. However, no interspherulitic boundary strengthening was observed. Indeed, because the copolymers discussed are amorphous, they are unable to crystallize and hence cannot provide reinforced spherulite boundaries and interlamellar links, as in the present invention.

Several U.S. patents are also directed to propylene ethylene polymer compositions see for example U.S. Pat. Nos. 4,946,898 and 4,948,841 to Kasahara et al., U.S. Pat. No. 4,774,292 to Thiersault et al., and U.S. Pat. No. 4,395,519 to Minami et al.

SUMMARY OF THE INVENTION

The above patents do not disclose a semicrystalline polymer blend where the copolymer of the blend is preferentially located at the spherulite boundaries as does the present invention.

This invention relates both to a process of making and to a semicrystalline polymer composition with reinforced boundaries and interlamellar links, comprising a major amount of a first semicrystalline homopolymer (H-1) or semicrystalline copolymer (CO-1) and a minor amount of a second semi crystalline homopolymer (H-2), or a second semicrystalline copolymer (C0-2), or a first semicrystalline copolymer (CO-1) and a second semicrystalline copolymer (C0-2) and a process of making the same. The second semicrystalline homopolymer (H-2) or copolymer (C0-2) co-crystallize between at least two adjacent lamellae of the first homopolymer (H-1) or copolymer (CO-1). If the first semicrystalline homopolymer (H-1) or copolymer (CO-1) forms spherulites, the second semicrystalline homopolymer (H-2) or copolymer (C0-2) will be co-crystallized between at least two adjacent lamellae of an individual spherulite as well as between at least two lamellae of adjacent spherulites. As used herein, a minor amount means about 0.1 to about 20 wt. % and a major amount means at least about 80 wt. % up to about 99.9 wt. %. The polymer blend can be used to prepare molded and extruded articles.

As the first semicrystalline homopolymer (H-1) or copolymer (CO-1) crystallizes, the noncrystallizable segments of the second semicrystalline copolymer (C0-2) or second homopolymer (H-2) are rejected from the lamellae of the first homopolymer or copolymer. Probably, the crystallization of the crystallizable segments of the second homopolymer (H-2) or copolymer (C0-2) in adjacent lamellae within or between spherulites or between random lamellae allows for strengthening of the interlamellar and interspherulitic regions by adding to tie molecule concentration (i.e., those chains which bridge adjacent lamellae). These regions would otherwise have a tendency to be weak under many loading conditions.

In accordance with the instant invention, applicants achieve an increase of at least about 50% in toughness (Izod impact strength) and simultaneously, less than a 5% decrease in stiffness (flexural modulus). Hence, toughness is significantly increased with virtually no loss in stiffness.

The following table represents the possible compositions in accordance with the instant invention.

| Major Amount (80–99.9%) | blended with | Minor Amount (0.1%–20%) |
|---|---|---|
| semicrystalline homopolymer (H-1) | | semicrystalline homopolymer (H-2) |
| semicrystalline homopolymer (H-1) | | semicrystalline copolymer (C0-2) |
| semicrystalline copolymer (CO-1) | | semicrystalline copolymer (C0-2) |

Hence, the invention is directed toward a polymer blend composition comprising about 80 to about 99.9 wt. % of a first semicrystalline homopolymer or semicrystalline copolymer and about 0.1 to about 20 wt. % of a second semicrystalline homopolymer or a second semicrystalline copolymer, wherein said second semicrystalline homopolymer or second semicrystalline copolymer is co-crystallized between two or more lamellae of said first semicrystalline homopolymer or copolymer, and wherein when said first homopolymer is blended with a second copolymer, said second copolymer may optionally be a block copolymer such as a triblock, multiblock, coupled diblock or graft copolymer of said first semicrystalline homopolymer and a comonomer selected from the group consisting of segments of said first homopolymer and segments of a $C_2$–$C_5$ α-olefin, segments of said first homopolymer and segments of $C_2$–$C_5$ comonomer, coupled diblock copolymers having multiarm stars containing monomer sequences of said first homopolymer, graft copolymers having pendant arms of monomer sequences of said first homopolymer and mixtures thereof, and wherein when said first semicrystalline homopolymer is blended with a second semicrystalline homopolymer said first semicrystalline homopolymer will have tacticity and will be selected from the group consisting of isotactic and syndiotactic semicrystalline homopolymer, and wherein said second semicrystalline homopolymer is the same semicrystalline homopolymer as said first semicrystalline homopolymer but having at least about 5% of the same tacticity as said first semicrystalline homopolymer in addition to at least about 0.5% of a different tacticity said different tacticity being selected from the group consisting of atactic sequences, isotactic sequences, and a combination of atactic and isotactic sequences, when said first semicrystalline homopolymer is syndiotactic homopolymer, and wherein said different tacticity is selected from the group consisting of atactic sequences, syndiotactic sequences, and a combination of atactic and syndiotactic sequences, when said first semicrystalline homopolymer is isotactic homopolymer, wherein said atactic, isotactic, syndiotactic, combination of atactic and isotactic, and combination of atactic and syndiotactic sequences are in triblock and multiblock form and wherein when said first copolymer is blended with a second copolymer said first copolymer comprises a homopolymer with isolated comonomer units in random form and said second copolymer has at least about 40% of sequences of said homopolymer of said first copolymer and at least about 0.5% of sequences differing (as described above) from those of said first copolymer.

The invention is further directed to a process of forming a polymer composition having increased spherulite boundary and interlamellar strength comprising the steps of:

(a) mixing about 80 to about 99.9 wt. % of a first semicrystalline homopolymer or semicrystalline copolymer and about 0.1 to about 20 wt. % of a second semicrystalline homopolymer or a second semicrystalline copolymer, wherein said second semicrystalline homopolymer or second semicrystalline copolymer is co-crystallized between two or more lamellae of said first semicrystalline homopolymer or copolymer, and wherein when said first homopolymer is blended with a second copolymer, said second copolymer is a copolymer or block copolymer such as a triblock, multiblock, coupled diblock or graft copolymer of said first semicrystalline homopolymer and a comonomer selected from the group consisting of segments of said first homopolymer alternating with segments of a $C_2$–$C_5$ α-olefin, segments first homopolymer alternating with segments of $C_2$–$C_5$ comonomer coupled diblock copolymers having multiarm stars containing monomer sequences of said first homopolymer, graft copolymers having pendant arms of monomer sequences of said first homopolymer and mixtures thereof, and wherein when said first semicrystalline homopolymer is blended with a second semicrystalline homopolymer said first semicrystalline homopolymer will have tacticity and will be selected from the group consisting of isotactic and syndiotactic semicrystalline homopolymer, and wherein said second semicrystalline homopolymer is the same semicrystalline homopolymer as said first semicrystalline homopolymer but having at least about 5% of the same tacticity as said first semicrystalline homopolymer in addition to at least about 0.5% of a different tacticity said different tacticity being selected from the group consisting of atactic sequences, isotactic sequences, and a combination of atactic and isotactic sequences, when said first semicrystalline homopolymer is syndiotactic homopolymer, and wherein said different tacticity is selected from the group consisting of atactic sequences, syndiotactic sequences, and a combination of atactic and syndiotactic sequences. When said first semicrystalline homopolymer is isotactic homopolymer, wherein said atactic, isotactic, syndiotactic, combination of atactic and isotactic, and combination of atactic and syndiotactic sequences are in triblock and multiblock form and wherein when said first copolymer is blended with said second copolymer said first copolymer comprises a homopolymer with isolated comonomer units in random form and said second copolymer has at least about 40% of sequences of said homopolymer of said first copolymer and at least about 0.5% of sequences differing (as described above) from those of said first copolymer;

(b) melting said polymer mixture wherein said semicrystalline polymers mix on the molecular nanoscale;

(c) crystallizing said melted polymer mixture by cooling at a rate sufficient to allow said first semicrystalline homopolymer or copolymer to form lamellae and to reject said second semicrystalline homopolymer or semicrystalline copolymer between adjacent lamellae and thereafter continuing to cool to allow said second semicrystalline copolymer or said second semicrystalline homopolymer to co-crystallize between at least two or more adjacent lamellae.

DETAILED DESCRIPTION

All polymers referred to herein are semicrystalline polymers. Semicrystalline polymers have both a crystalline segment and an amorphous segment, the former residing in a plate-like lamellar structure. During crystallization, the lamellae may be randomly oriented or become radially oriented into structures known as spherulites. The lamellae and spherulites have a tendency to reject low molecular weight polymer as well as various impurities into interlamellar and interspherulitic regions. This rejection often results in poor mechanical performance since the interlamellar and interspherulitic regions are local areas of mechanical weakness.

By this invention a polymer blend is obtained with increased toughness and virtually no decrease in stiffness. The second homopolymer (H-2) or second copolymer (CO-2) must exhibit two criteria to be usable in the instant invention. The second copolymer (CO-2) or second homopolymer (H-2) must mix with the first homopolymer (H-1) or copolymer (CO-1) on the molecular or nanoscale level in the melt; secondly, they must co-crystallize during the cooling schedule employed between two or more adjacent, previously formed lamellae of the first homopolymer (H-1) or copolymer (CO-1) and/or between two or more adjacent lamellae of two or more adjacent spherulites when said first semicrystalline homopolymer (H-1) or copolymer (CO-1) forms spherulites.

When the first homopolymer (H-1) is blended with a second copolymer (CO-2), the second copolymer is comprised of the first homopolymer and sequences of comonomer. The copolymer is about 0.1 to about 20 wt. %, preferably about 5 wt. % to about 10 wt. %, of the polymer blend formed by this invention depending on the homopolymer and comonomer used. The amount of comonomer in the copolymer can range from about 5 to about 70 wt. % depending on the comonomer used. The amount of comonomer must be such that the copolymer meets the two criteria described above. The copolymer consists of segments of the first homopolymer and segments of an α-olefin such as a $C_2$–$C_5$ α-olefin. If a block copolymer is used, the sequences or blocks of sequences of said first homopolymer alternate with $C_2$–$C_5$ comonomer. Alternatively, the second copolymer may consist of coupled diblock copolymers resulting in multiarmed stars containing polymer sequences identical to the first homopolymer. Another alternative is a graft copolymer where the pendant arms consisting of polymer sequences are identical to the first homopolymer. See, for example, U.S. Pat. No. 4,716,207 describing such star copolymers, herein incorporated by reference and *Macromolecules,* 1993, 26, 2064 describing such graft copolymers, herein incorporated by reference. For other homopolymers, copolymers, or both, these criteria will vary depending on how well the copolymer meets the crystallization and nanoscale mixing criteria above.

One skilled in the art can readily determine if a second copolymer or second homopolymer will meet the criteria for use in the instant invention by blending the two polymers of the final blend and melting the blend in a differential scanning calorimeter. If upon melting, only one endotherm is displayed, then the material has co-crystallized. Alternatively, if there are two melting endotherms, then the areas under the endotherms are computed. If the area under the higher melting endotherm is greater than the Rule of Mixtures would predict, then co-crystallization has taken place. As used herein comonomer means one of the monomers comprising the copolymer.

The second copolymers used in the present invention may be olefin based copolymers, meaning that the polymer chain backbone is an olefin, or olefin based block copolymers. A block copolymer is one in which the monomer units occur in relatively long alternate sequences on a chain.

A preferred second copolymer is ethylene-propylene copolymer. Copolymers are commercially used as viscosity modifiers, oil additives, thermoplastic elastomers, and impact-resistant plastics. The process of preparing the ethylene-propylene copolymers of the present invention includes sequentially contacting ethylene with an α-olefin monomer (propylene) in a suitable solvent at about 0° C. in the presence of an activated cyclopentadienyl catalyst system. The activated catalyst will polymerize the α-olefin to form a polymer. The ethylene-propylene copolymer can be prepared, e.g., by using dry and inert (nitrogen) atmosphere and using a 1 L autoclave reactor fitted with a stirrer, and charged with ca. 700 ml of dry toluene diluent. The temperature of the reactor is lowered to −1° C. with the help of a cooler. Next, ca. 110 psi of propylene gas and ca. 32 psi of ethylene gas from separate containers (ca. 1.1 L) are introduced in the reactor. The catalyst solution is prepared in a dry box. A typical catalyst solution contains $1.9 \times 10^{-5}$ moles of N,N dimethylanilinium terakis(pentafluoro)boron [DMAH][B(pfp)4] complex and $4.0 \times 10^{-5}$ moles of dimethyl silyl bis-indenyl Hafnium dimethyl [[(CH3)$_2$Si(Ind)2] Hf(CH3)$_2$], abbreviated as Hf-SS-dimethyl metallocene, in ca. 5 ml of toluene. The amount of [DMAH][B(pfp)4] and (Hf-SS-dimethyl metallocene) may vary. The catalyst solution is added to the reactor by high pressure nitrogen to induce polymerization. Reactor pressure and temperature are monitored during the polymerization. A temperature jump of 8° C. is observed over a period of 6 minutes since the addition of the catalyst solution. After the initial temperature jump, the reactor temperature levels off and decreases with increasing polymerization time. The reactor is vented completely after ca. 20 minutes of polymerization and the content of the reactor is poured into a beaker containing a large excess of acetone. The precipitated polymer is dried under vacuum at ca. 100° C. for 24 hours. An ethylene propylene copolymer results.

The procedure outlined above can be repeated using ca. 120 psi of propylene gas and ca. 25 psi of ethylene gas. The catalyst solution is prepared from $1.5 \times 10^{-5}$ moles of [DMAH][B(pfp)4] complex and $4.0 \times 10^{-5}$ moles of Hf-SS-dimethyl metallocene in ca. 5 ml of toluene. The initial temperature jump observed is 6° C. over a period of the first 6 minutes of polymerization. An ethylene propylene copolymer results.

The first homopolymer may be a polyolefin. The first homopolymer may be selected from, for example, polypropylene and polyethylene. Preferably, the first homopolymer is polypropylene, more preferably isotactic polypropylene. Alternatively, it may be high density or low density polyethylene. In the case of polyproplyene, the comonomers of the second copolymer (if a second copolymer is chosen for the blend) are selected from ethylene-propylene. When polyethylene is the first homopolymer the comonomers may be selected e.g. from alpha olefins. Hence, the copolymers utilized when polyethylene is the first homopolymer are e.g. alternating ethylene alpha olefins. The alpha olefins may be selected from propylene, butene, and 4-methylpentene with alternating units of ethylene propylene being preferred. A principal condition is that the copolymers co-crystallize onto adjacent lamellae of the first homopolymer during crystallization. Alternatively, the first homopolymer may be blended with a second homopolymer. When a second homopolymer is mixed with the first homopolymer, the second homopolymer is about 0.1 to about 20 wt. % of the polymer formed, preferably about 5 to about 10 wt. %. In this case the first homopolymer will be a homopolymer displaying either isotactic or syndiotactic tacticity. The second homopolymer will be the same homopolymer as the first homopolymer, however its backbone chain will have the same tacticity as the first homopolymer in addition to nonstereoregular sequences, sequences of a different stereoregularity, a combination of both nonstereoregular sequences and sequences of a different stereoregularity, isolated nonstereoregular units or a combination of sequences of a different stereoregularity and isolated nonstereoregular units. Such additional sequences of the second homopolymer probably lower the crystallinity and the crystallization temperature of the second homopolymer, allowing the first homopolymer to form lamellae or spherulites before the second homopolymer located between lamellae and at spherulite boundaries cocrystallizes.

The nonstereoregular sequences, sequences of a different stereoregularity, or a combination of nonstereoregular sequences and sequences of a different stereoregularity of the second homopolymer may be in triblock, or multiblock form.

As used herein, the nonstereoregular sequences or units are atactic sequences or units and the sequences of a different stereoregularity are syndiotactic sequences when the first homopolymer is isotactic homopolymer, and are isotactic sequences when the first homopolymer is syndiotactic homopolymer. In general all that is needed is that a portion of the second homopolymer backbone chain be identical to that of the first homopolymer, and that the remainder of the second homopolymer comprise homopolymer in nonstereoregular sequences, sequences of a different stereoregularity, a combination of the two, or isolated non-stereoregular units.

For example, if the first homopolymer is isotactic polypropylene, the second homopolymer could consist of triblock, or multiblock form isotactic and atactic polypropylene or isotactic and syndiotactic polypropylene. Alternatively the second homopolymer could consist of segments of isotactic polypropylene with a combination of syndiotactic and atactic polypropylene.

The amount of the second homopolymer backbone chain which must be identical to that of the first homopolymer (displaying the same tacticity) is an effective amount which will enable the second homopolymer to co-crystallize (attach itself to) between two or more adjacent lamellae and within spherulites and/or at the ends of lamellae across adjacent spherulite boundaries of spherulites if formed by the first homopolymer. The amount of second homopolymer which must differ from that of the first homopolymer is an effective amount which will allow the second homopolymer residing in the interlamellar regions to co-crystallize across adjacent lamellae and/or lamellae of adjacent spherulites. The amount of second homopolymer backbone chain which must be identical to that of the first homopolymer is at least about 40% (maximum 99.5%). The amount of the second homopolymer backbone chain which must differ from that of the first homopolymer is at least about 0.5% (maximum 60%). A portion of the second homopolymer may remain between the spherulite lamellae of the first homopolymer, co-crystallize and attach itself between two or more adjacent lamellae within the spherulite of the first homopolymer thereby increasing tie molecule concentration and further increasing the polymer's toughness. As used herein, nonstereoregular sequences are atactic sequences, and sequences of a different stereoregularity are isotactic if the first homopolymer is a syndiotactic homopolymer and are syndiotactic when the first homopolymer is an isotactic homopolymer.

The second homopolymers can be easily prepared by one skilled in the art (See for example, J. Am. Chem. Soc., 1990, 112, 2030–2031 "rac-[Ethylidene(1-$\eta^5$-tetramethylcyclopentadienyl)(1-$\eta^5$ indenyl)] dichlorotitanium and Its Homopolymerization of Propylene to Crystalline-Amorphous Block Thermoplastic Elastomers, Mallin, Rausch, Lin, Dong, and Chien; Macromolecules, Vol. 25, No. 4, 1992, 1242–1252, "Crystalline-Amorphous Block Polypropylene and Nonsymmetric ansa-Metallocene Catalyzed Polymerization," Llinas, Dong, Mallin, Rausch, Lin, Winter, and Chien; Macromolecules, 1990, 23, 3559–3568, "Degree of Stereochemical Control of rac-Et [Ind]$_2$ ZrCl$_2$/MAO Catalyst and Properties of Anisotactic Polypropylenes[1]" Rieger, Mu, Mallin, Rausch, and Chien.

As a third alternative, two semicrystalline copolymers can be blended to form the final composition. In such a case, the first copolymer is comprised of a homopolymer with isolated comonomer units in random form. The second copolymer need only comprise sequences identical to the homopolymer of the first copolymer as well as other sequences. The amount of sequences which must be identical is at least about 40% (max. 99.5%). Hence, the amount of sequences differing from that of the first copolymer will be at least about 0.5% (maximum 60%). As an example, linear low density polyethylene may be used.

It was found that the addition of about 0.1% of a nucleating agent was effective in raising the crystallization temperature of the first homopolymer. Nucleating agents are readily selected by the skilled artisan.

During crystallization, the first homopolymer crystallizes first, but also allows the crystallizable segments of the second homopolymer or second copolymer to co-crystallize with it. However, the noncrystallizable segments of the second copolymer or second homopolymer will be rejected between adjacent lamellae and within or between spherulites. The crystallizable segments of the second copolymer or second homopolymer chains which are between lamellae attach themselves to adjacent lamellae, enhancing the link between these lamellae by adding to interlamellar tie molecule concentration. The crystallizable segments of the second copolymer or second homopolymer chain which are at the spherulite boundaries attach themselves to the lamellae across adjacent boundaries enhancing the concentration of interspherulitic tie molecules. In this way, the molecular link between spherulites and lamellae becomes enhanced resulting in improved failure resistance and mechanical performance.

The following examples are illustrative and not limiting in any way.

EXAMPLE 1

45 grams of 5 melt index high density polyethylene (HDPE) of density equalling 0.960 was dry blended with 2.5 grams of ethylene ethylene propylene-ethylene triblock copolymer of 100,000 molecular weight prepared in accordance with Macromolecules. 1992, 25, 939–943 "Order Disorder Transitions: Diblock vs Triblock Copolymers" where the alternating ethylene-propylene segments made up 40% of the triblock. In addition, 45 grams of a 12 melt flow rate linear low density polyethylene using a butene comonomer was dry blended with the same material. The materials were blended in a mixing extruder, compression molded into specimens for Izod impact strength, flexural modulus and environmental stress crack resistance (ESCR) testing, and aged for ten days. The results are listed below:

| Polymer | Flexural Modulus (psi) | | Izod Impact (in lbs) | | ESCR ($F_{50}$, hrs) |
|---|---|---|---|---|---|
| HDPE | 103,500 | 9,135 | 3.86 | 0.10 | 1 |
| HDPE + triblock | 101,700 | 3,700 | 12.01 | 0.70 | 4 |
| LLDPE | 40,560 | 861 | no break | | 10 |
| LLDPE + triblock | 39,280 | 497 | no break | | 250 |

EXAMPLE 2

6.3 grams of 200 melt flow rate polypropylene homopolymer was combined with 0.7 grams of a crystalline-amorphous block polypropylene prepared in accordance with J. Am. Chem. Soc. 1990. 112, 2030–2031, "rac-[Ethylidene(1-$\eta^5$-tetramethylcyclopentadienyl)(1-$\eta^5$ indenyl)]dichlorotitanium and Its Homopolymerization of Propylene to Crystalline-Amorphous Block Thermoplastic Elastomers, Mallin, Rausch, Lin, Dong, and Chien, only polymerized at 30° C. The two polymers were dry blended by mixing in a paper cup. The mixture was then extruded at a temperature of 190° C. and pelletized.

5 grams were then placed within a tensile mold 0.020 inches thick, 0.1 inches wide, and 1 inch long between two aluminum sheets in a compression mold and melted at 200° C. for two minutes under slight pressure. 5,000 lbs of pressure were applied to the 12"×12" platens containing the melt. The material was then cooled at a rate of approximately 100° C. per minute by transferring the mold and aluminum between water cooled platens. An impact specimen was prepared by taking some of the tensile specimens and remolding them into an impact specimen using the same molding conditions as above. Tensile properties of this blend show an elongation of 300%, versus 5.7% for the 200 melt flow rate base polypropylene alone. Impact energy was 0.4 inch-pounds for the blend versus 0.04 inch-pounds for the base polypropylene.

EXAMPLE 3

18 grams of 1.5 melt flow rate isotactic polypropylene homopolymer was combined with 2 grams of a crystalline-amorphous block polypropylene prepared in accordance with J. Am. Chem. Soc. 1990, 112, 2030–2031, "rac-[Ethylidene(1-$\eta^5$-tetramethylcyclopentadienyl)(1-$\eta^5$ indenyl)]dichlorotitanium and Its Homopolymerization of Propylene to Crystalline-Amorphous Block Thermoplastic Elastomers, Mallin, Rausch, Lin, Dong, and Chien, only polymerized at 30 ° C. 0.02 grams of sodium benzoate were added to this mixture as a nucleating agent. The two polymers were ground under liquid nitrogen and dry blended by mixing in a paper cup. The mixture was then extruded at a temperature of 200° C. and pelletized.

The polymer was then placed within a mold used for making impact specimens in accordance with ASTM D256. The mold was placed between two aluminum sheets in a compression mold and melted at 200° C. for two minutes under slight pressure for one minute. 5,000 lbs of pressure was then applied to the 12"×12" platens containing the mold and the melt for one more minute. The material was then cooled at a rate of approximately 100° C. per minute by transferring the mold and aluminum between water cooled platens. Some samples were tested for flexural modulus and others were tested for impact. Flexural modulus of the blend was 152,300 psi, versus 156,300 psi for the 1.5 melt flow rate base polypropylene alone. Izod impact energy was 2.3 inch pounds versus 1.5 inch pounds for the base polypropylene.

EXAMPLE 4

18 grams of 1.3 melt flow rate high crystallinity polypropylene homopolymer (containing an isopentad fraction of 95% or greater, with an infrared crystallinity index of 97.5% or greater) was combined with the ethylene-propylene copolymer made according to the procedure in the Detailed Description of the Invention. 0.02 grams of sodium benzoate was added to the blend as a nucleating agent The two polymers were dry blended by mixing in a paper cup. The mixture was then extruded and pelletized.

The polymer was then placed within a mold for making Izod impact specimens in accordance with ASTM D256. The mold was placed between two aluminum sheets in a compression mold and melted at 200° C. for two minutes under slight pressure for one minute. 5,000 pounds of pressure were then applied to the 12"×12" platens containing the mold, aluminum sheets and the melt for one more minute. The material was then cooled at a rate of approximately 100° C. per minute by transferring the mold and aluminum between water cooled platens. Some samples were tested for flexural modulus, while others were tested in impact. Flexural modulus of the blend was 196,200 psi versus 193,600 psi for the 1.3 MFR high crystallinity base polymer. Izod impact yielded a so-called hinged break, with impact energy of 9.7 inch-pounds, versus 1.3 inch-pounds for the base polypropylene. These tests demonstrate that a full order of magnitude in impact strength is obtained according to this invention with no attendant reduction in flexural modulus.

What is claimed is:

1. In a composition consisting essentially of a blend of 70 to 99 wt. % of a semicrystalline, isotactic polypropylene homopolymer and 0.1 to 20 wt. % of a semicrystalline poly(propylene co-ethylene) copolymer, the improvement wherein the copolymer is prepared in the presence of at least one metallocene compound.

2. The composition of claim 1 wherein the ethylene in the ethylene-propylene copolymer ranges from about 10 wt. % to about 25 wt. %.

3. The composition of claim 2 wherein the amount of ethylene-propylene copolymer in the blend ranges from about 5 wt. % to about 20 wt. %.

4. The composition of claim 3 wherein the propylene polymer and the ethylene-propylene copolymer cocrystallize.

5. A method for increasing the impact strength of polypropylene without reducing flexural modulus, consisting of blending 70 to 99 wt. % of semi-crystalline, isotactic polypropylene with 0.1 to 20 wt. % of semicrystalline ethylene-propylene copolymer, wherein the copolymer is formed in the presence of at least one metallocene compound.

* * * * *